April 1, 1952 H. D. FARNSWORTH 2,591,247
COINCIDENCE AMPLIFIER
Filed Feb. 27, 1948
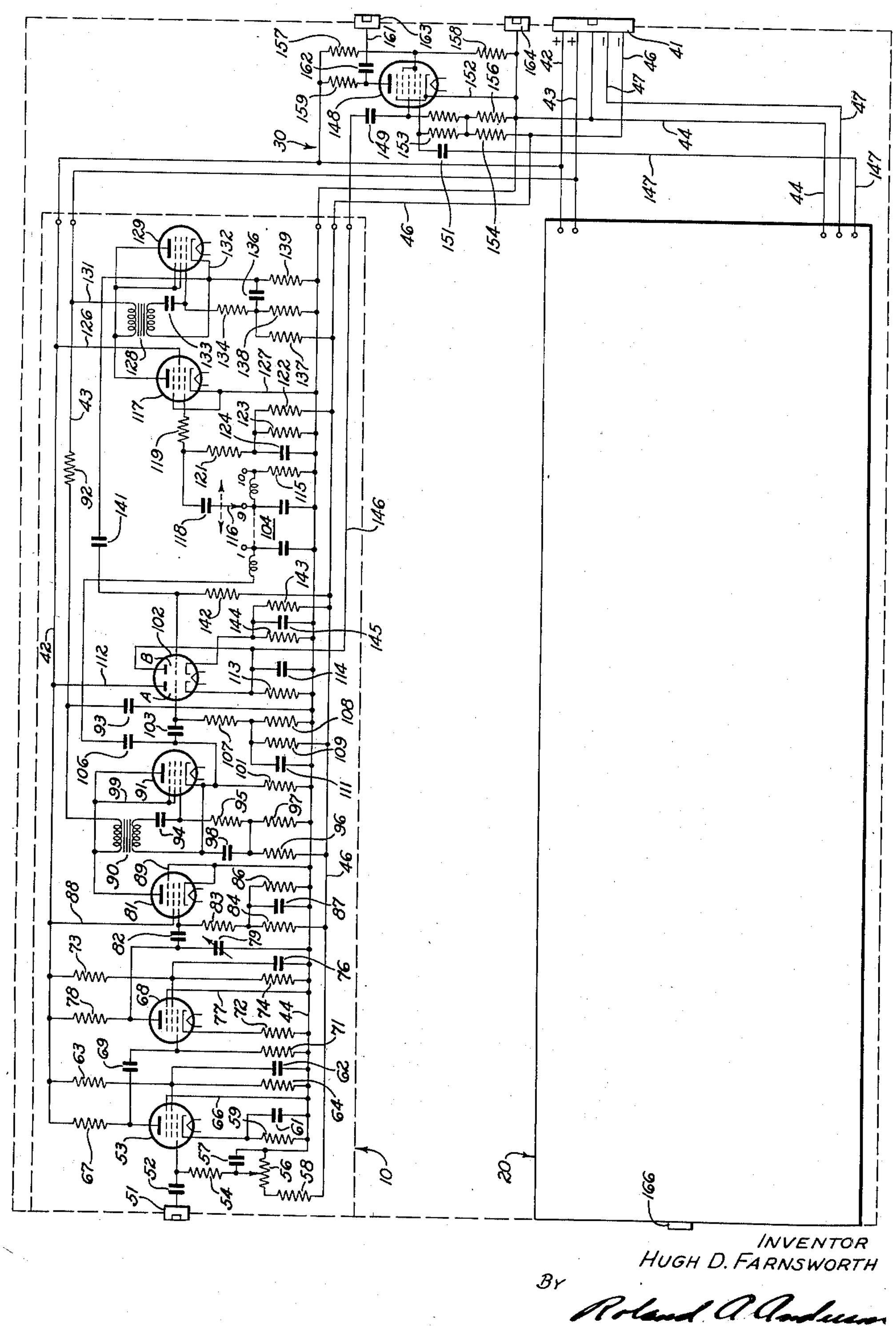
INVENTOR
HUGH D. FARNSWORTH
BY Roland A. Anderson
ATTORNEY.

Patented Apr. 1, 1952

2,591,247

UNITED STATES PATENT OFFICE 2,591,247

COINCIDENCE AMPLIFIER

Hugh D. Farnsworth, Berkeley, Calif., assignor to the United States of America as represented by the United States Atomic Energy Commission Application February 27, 1948, Serial No. 11,605

5 Claims. (Cl. 250—27)

This invention relates to a two channel amplifier circuit arranged to provide a single output and more particularly to a coincidence amplifier.

In present day research projects for determining the properties of atomic particles, it is necessary to count the quantity of such particles traveling in a given direction. For accurate determinations it is necessary to eliminate those particles which are due to scattering. It is proposed by this invention to devise an electrical circuit to operate with ionization chambers to eliminate inaccuracy in particle counting due to random and scattered particles.

It is therefore an object of the invention to provide a coincidence amplifier.

Another object of the invention is to provide a multichannel amplifier, the output signals of which are applied to a mixer in such a manner that a signal has to appear simultaneously at the output of each channel before a signal will appear at the output of the mixer.

A further object of the invention is to provide a new and improved circuit for determining the quantity of high speed particles traveling in a predetermined direction.

A still further object of the invention is to provide a coincidence amplifier comprising a trigger circuit, a first blocking grid oscillator to charge a condenser and to operate a second blocking grid oscillator, which in turn causes the condenser to discharge, forming a voltage of variable duration in response to each input pulse of voltage.

Other objects and advantages will be apparent in the following description and claims considered together with the accompanying drawing in which:

There is illustrated a schematic wiring diagram embodying the invention.

Referring to the drawing in detail, there is shown a first amplifier channel 10, a second amplifier channel 20, and a mixer 30. The two amplifier channels 10 and 20 are identical in all respects and the following description will deal only with the first amplifier channel 10, as being representative. A plug 41 which is externally connected to a power supply (not shown) furnishes a first and second voltage or positive polarity 42 and 43 to both amplifier channels, a ground connection 44 to both amplifier channels, and a separate negative voltage 46 and 47 to the two amplifier channels 10 and 20 respectively. An input plug 51 is connected to a coupling condenser 52 which, in turn, is connected to the control grid of a pentode type tube 53. The control grid of this tube 53 is connected to a resistor 54 which is connected to the adjustable portion of a potentiometer 56 and a condenser 57. One end of the potentiometer 56 is connected to the open end of the condenser 57 and to the ground connection 44, while the other end of the potentiometer 56 is connected to a resistor 58 which is, in turn, connected to the negative voltage 46. The cathode of the tube 53 is connected to the ground connection 44 through a parallel network comprising a resistor 59 and a condenser 61. The screen grid of the tube 53 is connected to the ground connection 44 through a by-pass condenser 62 and is further connected to the common junction of two resistors 63 and 64 of a resistance voltage divider connected between the positive voltage 42 and the ground connection 44. The suppressor grid of the tube 53 is held at ground potential by the lead 66 which electrically connects them. A further connection of the tube 53 is made from the anode to the positive voltage 42 through a dropping resistor 67 and to the control grid of a pentode type tube 68 through a coupling condenser 69. The control grid of the tube 68 is connected to the ground connection 44 through a resistor 71. Further connections of the tube 68 are as follows: the cathode is connected to the ground connection 44 through a resistor 72, the screen is connected to the common junction of two resistors 73 and 74 which divide the voltage between the positive voltage 42 and the ground connection 44 and is further connected to the ground connection 44 through a by-pass condenser 76, the suppressor grid is connected to the ground connection 44 by means of a lead 77, and the anode is connected to the positive voltage 42 through a dropping resistor 78 and further to the ground connection 44 through a variable condenser 79. The anode of the tube 68 is still further connected to the control grid of a pentode type tube 81 through a coupling condenser 82. The control grid of the tube 81 is also connected to a resistor 83 which is connected to the junction of two resistors 84 and 86 comprising a voltage divider between the negative voltage 46 and the ground connection 44. The junction between the two resistors 84 and 86 is connected to the ground connection 44 through a condenser 87. Other connections of the tube 81 are as follows: the screen grid is connected to the positive voltage 42 by the lead 88, the suppressor grid is connected to the cathode by a lead 89 and further to the ground connection 44 by the same lead, and the anode is connected to one terminal of the primary winding of a transformer 90 and to the anode of a pentode type tube 91. The second terminal of the primary winding of the transformer 90 is connected to the positive voltage 43 through a dropping resistor 92 and is also connected to the ground connection 44 through a by-pass condenser 93. One terminal of the secondary winding of the transformer 90 is connected to the cathode of the tube 91 and the second terminal is connected to the control grid of the tube 91 through a coupling condenser 94. The control grid of the tube 91 is also connected to a resistor 95 which is, in turn, connected to the junction of two resistors 96 and 97. These two resistors 96 and 97 are serially connected between the negative voltage 46 and the ground connection 44. The junction between the resistors 96 and 97 is connected to the cathode of the tube 91 through a blocking condenser 98. Other connections of the tube 91 are as follows: the anode is connected to the screen grid and suppressor grid by a lead 99, and the cathode is connected to the ground connection 44 through a resistor 101. The cathode of this tube 91 is further connected to the control grid of triode A of a double triode type tube 102 through a coupling condenser 103 and to the first section of a multi-section delay line 104 through a coupling condenser 106. The control grid of triode A of of the tube 102 is connected to a resistor 107 which is, in turn, connected to the junction of two resistors 108 and 109 of a voltage divider between the negative voltage 46 and the ground connection 44. The junction between the two resistors 108 and 109 is further connected to the ground connection 44 through a condenser 111. The anode of triode A of this tube 102 is directly connected to the positive voltage 42 by means of a lead 112. A further connection of the tube 102 is made from the cathode to the ground connection 44 through a resistor 113 and a storage condenser 114. The delay line 104 comprises ten sections which are serially connected, each section comprising an inductance and a condenser and the last section is terminated in a resistor 115. The junction between each of the ten sections of the delay line 104 is tapped to a contact point on a selector switch 116, the variable element of which is connected to the control grid of a pentode tube 117 through a serially connected coupling condenser 118 and current limiting resistor 119. The junction between the condenser 118 and the resistor 119 is connected to a resistor 121 which is, in turn, connected to the junction between two resistors 122 and 123 of a voltage divider between the negative voltage 46 and the ground connection 44. The junction between the resistors 122 and 123 is further connected to the ground connection 44 through a by-pass condenser 124. Other connections of the tube 117 are as follows: the screen grid is directly connected to the positive voltage 42 by a lead 126, the suppressor grid is connected to the cathode and to the ground connection 44 by a lead 127, the anode is connected to one terminal of the primary winding of a transformer 128 and to the anode, screen grid, and suppressor grid of a pentode type tube 129. The other terminal of the primary winding of the transformer 128 is connected directly to the positive voltage 43 by a lead 131. One terminal of the secondary winding of this transformer 128 is directly connected to the cathode of the tube 129 by a lead 132 and the other terminal of the winding is connected to the control grid of the tube 129 through a coupling condenser 133. Further connections of the tube 129 are as follows: the control grid is connected to a resistor 134 which, in turn, is connected to the cathode through a condenser 136 and to the junction of two resistors 137 and 138 comprising a voltage divider between the negative voltage 46 and the ground connection 44, and the cathode is connected to the ground connection 44 through a resistor 139. The cathode of the tube 129 is further connected to the control grid of triode B of the tube 102 through a coupling condenser 141. Other connections of triode B of the tube 102 are as follows: the control grid is connected to the negative voltage 46 through a biasing resistor 142, the cathode is connected to the junction of two resistors 143 and 144 which comprise a voltage divider between the negative voltage 46 and the ground connection 44, and the anode is connected to cathode of triode A of this tube. The junction between the resistors 143 and 144 is further connected to the ground connection 44 through a by-pass condenser 145. An output lead 146 is also connected to the anode of triode B of the tube 102 and serves as a coupling means for the signal of the first amplifier channel 10. A similar output lead 147 serves as a coupling means for the signal of the second amplifier channel 20. The lead 146 is connected to the third grid of a multigrid type tube 148 through a coupling condenser 149 and the lead 147 is connected to the first grid of the tube 148 through a coupling condenser 151. Other connections of this tube 148 are as follows: the cathode is directly connected to the ground connection 44 by a lead 152 and to the fifth grid, the first grid is connected to a resistor 153 which is connected to the junction of two resistors 154 and 156 which comprise a voltage divider between the negative voltage 46 and the ground connection 44, the second and fourth grids are connected together and further connected to the junction between two resistors 157 and 158 which comprise a voltage divider between the positive voltage 42 and the ground connection 44, and the anode is connected to the positive voltage 42 through a dropping resistor 159. An output lead 161 is connected to the anode of the tube 148 through a coupling condenser 162. The output lead 161 is further connected to an output plug 163. The ground connection 44 is connected to a second output plug 164. Further, a plug 166 serves as an input terminal for the signal to the second amplifier channel 20.

Now referring to the operation of the device, the connections of which have been described in detail above. With the input plugs 51 and 166 connected to ionization chambers to be used in coincidence counting of particles, a particle entering the chambers will cause an input pulse to appear at the plugs and thus impress a signal on the input circuits of the two amplifier channels 10 and 20. Since both amplifier channels 10 and 20 are identical, the operation of the first channel 10 will be dealt with in detail hereinbelow.

A positive pulse of voltage at the input plug 51 of the amplifier channel 10 impresses a positive pulse of voltage at the control grid of the tube 53. Since the tubes 53 and 68 are interconnected and properly biased to form a pulse forming amplifier circuit with the tube 53 normally nonconductive and the tube 68 normally conductive, the positive pulse of voltage causes the tube 53 to conduct, thereby resulting in the tube 68 becoming nonconductive. As the current ceases to flow through the tube 68 the anode voltage of this tube increases toward the value of the positive voltage 42, which increase in voltage is coupled to the control grid of the tube 81. Now, since the tubes 81 and 91 are interconnected and properly biased to form a trigger circuit and a blocking oscillator circuit, respectively, the positive voltage pulse impressed at the control grid of the tube 81 results in the formation of a sharp positive voltage pulse being generated at the cathode of the tube 91 which is coupled to the control grid of triode A of the tube 102 and to the delay line 104. The aforementioned voltage pulse at the cathode of the tube 91 is in phase with the input pulse at the plug 51. The triode A of the tube 102 is connected as a cathode follower; therefore, the condenser 114 in its cathode circuit becomes charged positively during the time the tube conducts. Since the same positive pulse of voltage which results in the charging of the condenser 114 is coupled to the delay line, a positive pulse of voltage can be impressed at the input of a second trigger circuit and blocking oscillator circuit comprising the tubes 117 and 129, respectively, at a later time. The delay time is adjustable by means of the switch 116 which can be used to determine the number of sections of the delay line 104 to be utilized in the circuit. Thus, at a time later than that of the positive pulse of voltage at the cathode of the tube 91, a second positive pulse of voltage is formed at the cathode of the tube 129. Since the cathode of the tube 129 is coupled to the control grid of triode B of the tube 102 through the condenser 141 and the anode of this triode B is connected to the condenser 114, the anode of triode B is maintained positive by the charge on the condenser 114 and triode B conducts during the time its control grid is positive, thereby discharging the condenser 114. Thus, a positive voltage of variable duration is present across the condenser 114 and is available at the output lead 146 of the amplifier channel 10.

Similarly, a positive voltage of variable duration is available at the output lead 147 of the amplifier channel 20 in response to a positive input pulse of voltage at the input plug 166.

Now, with the leads 146 and 147 connected to the third and first grids of the mixer tube 148, it is seen that a voltage pulse will appear across the output plugs 163 and 164 only at such times as both grids are positive. Thus a coincidence circuit has been developed, whereby it is possible to trace the paths of charged particles and to count the number of these particles in any desired path with greater accuracy.

It is further seen that for still greater accuracy it is possible to connect two or more of these devices in cascade with the ionization chambers along the desired path and to mix the output signals in such a manner that only under the condition of a particle passing through all of the chambers, will an output signal from the final mixer stage be generated. It is to be noted that, although the means for mixing the output pulses of the amplifier channels has been shown in detail on the drawing, there are several methods by which the desired result can be obtained.

For coincidence counting a counter can be connected to the plugs 163 and 164. The output voltage at the plugs 163 and 164 can also be used to initiate operation of a secondary circuit if desired.

While the salient features of the invention have been described in detail with respect to one embodiment, it will, of course, be apparent that numerous modifications may be made within the spirit and scope of the invention and it is therefore not desired to limit the invention to the exact details shown except insofar as they may be defined in the following claims.

What is claimed is:

1. In a coincidence counting device the combination comprising at least two amplifier channels each having at least a first oscillator, means for initiating operation of said first oscillator in response to an input pulse of voltage, means for storing energy during operation of said first oscillator, a second oscillator responsive to the output voltage of said first oscillator at a predetermined later time, means responsive to the output of said second oscillator to discharge said stored energy, and means responsive to the output voltages of said amplifier channels whereby a single output of voltage is obtained when the output pulses of voltage of said amplifier channels occur within a predetermined period of time.

2. In a coincidence counting device the combination comprising at least two amplifier channels each having at least a pulse forming amplifier circuit operated by input pulses of voltage, a first oscillator responsive to the output voltage of said amplifier, a condenser for storing energy during operation of said first oscillator, a second oscillator responsive to the output voltage of said first oscillator at a predetermined later time, means responsive to the output of said second oscillator to discharge said condenser, and means responsive to the output voltages of said amplifier channels whereby a single output of voltage is obtained when the output pulses of voltage of said amplifier channels occur within a predetermined period of time.

3. In a pulse forming circuit the combination comprising a pulse forming amplifier circuit operated by input pulses of voltage, a first oscillator responsive to the output voltage of said amplifier, means for storing energy during operation of said first oscillator, a second oscillator responsive to the output voltage of said first oscillator at a predetermined later time, and means responsive to the output of said second oscillator to discharge said stored energy whereby a pulse of voltage of predetermined duration is formed across said energy storing means.

4. In a pulse forming circuit the combination comprising a pulse forming amplifier circuit operated by input pulses of voltage, a first oscillator responsive to the output of said amplifier, a condenser for storing energy during operation of said first oscillator, a second oscillator responsive to the output voltage of said first oscillator at a predetermined later time, and means responsive to the output of said second oscillator to discharge said condenser whereby a pulse of voltage of predetermined duration is formed across said condenser.

5. In a coincidence counting device, the combination comprising at least two amplifier channels, each of said channels having a first oscillator connected to a source of voltage pulses, a first triode tube with its control grid coupled to an output of said first oscillator for charging a condenser in its cathode circuit each time said oscillator is activated, a delay line connected to said output of said oscillator, a second oscillator connected to said delay line for forming a pulse of voltage at a predetermined time later, and a second triode tube with its control grid connected to the output of said second oscillator and its anode connected to said condenser whereby said condenser is discharged each time said second oscillator is activated forming a voltage of variable duration across said condenser, and means connected to said condenser of each channel for developing an output voltage only when said condensers are each charged.

HUGH D. FARNSWORTH.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,277,000 | Bingley | Mar. 17, 1942 |
| 2,403,527 | Hershberger | July 9, 1946 |
| 2,405,238 | Seeley | Aug. 6, 1946 |
| 2,419,340 | Easton | Apr. 22, 1947 |
| 2,482,782 | Lenny, Jr., et al. | Sept. 27, 1949 |

OTHER REFERENCES

Review of Scientific Instruments, February 1941, vol. 12, pp. 71–76, "The Interval Selector," by Roberts. Copy in Patent Office Library.

Review of Scientific Instruments, April 1942, vol. 13, pp. 143–147, "A Cosmic-Ray Radio Sonde," by Neher & Pickering. Copy in Patent Office Library.

Nature, April 26, 1930, No. 3156, vol. 125, p 636, "Method of Registering Multiple Simultaneous Impulses of Several Geiger's Counters," by Rossi. Copy in Patent Office Library.